Figure 1:
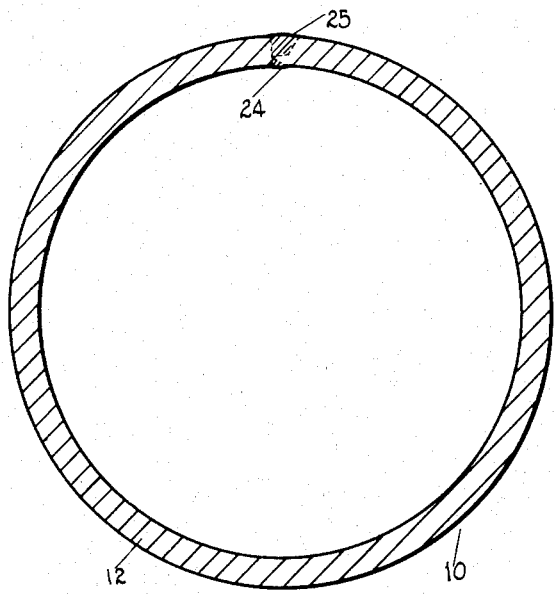

Oct. 23, 1934.  A. KIDD  1,977,678

ARC WELDING METHOD

Filed June 20, 1933

INVENTOR
Alexander Kidd
BY
Virgil F. Davis
ATTORNEY

Patented Oct. 23, 1934

1,977,678

UNITED STATES PATENT OFFICE

1,977,678
ARC WELDING METHOD

Alexander Kidd, Hawthorne, N. J., assignor to M. W. Kellogg Co., New York, N. Y., a corporation of Delaware Application June 20, 1933, Serial No. 676,635

8 Claims. (Cl. 219—10)

This invention relates to electric arc welding and in particular to the preparation of the edges of plates, which are to be joined, for receiving fusing metal deposited by means of the electric arc.

It has become the practice in manufacturing articles from metal plates by electric arc welding, especially when the plates are of substantial thickness, to form the edges to be joined by machining, pressing or the like, into component parts of welding grooves prior to the shaping of the plates and assemblying of the articles. Welding grooves of various forms have been proposed. The grooves at present preferred in the art are usually U or V-shaped, and in the case of thick plates are compound grooves, that is, the grooves comprise a main welding groove on one face of the plates, and a smaller supplementary groove on the other face of the plates, the grooves being separated by projections extending from the edges of the plates. The U-shaped grooves are considered the more efficient since it is possible to have access to all portions of the groove defining walls with a normal sized welding electrode without making the groove unduly wide. However, all of the welding grooves at present used have certain disadvantages which make the welding operation difficult and the manufacture of the articles more expensive than need be.

The main disadvantage arises from the fact that in order to carry on the welding operation with some degree of facility and to ensure the production of acceptable welds it is necessary to accurately align the extensions of the groove defining edges. Even with flat plate of moderate thickness the time and labor consumed to effect this result represents an appreciable proportion of the manufacturing cost; when the plate is of considerable thickness and/or is shaped the rigging required to secure the necessary alignment often times represents the major proportion of the manufacturing cost. In most instances the degree of accuracy of alignment of the extensions of the groove defining edges required for welding is much greater than that required by the tolerance allowance.

This invention has for an object a method of manufacturing articles from metal plates by electric arc welding in which the accuracy of the alignment of the edges to be joined depends solely on the tolerance allowed.

This invention has for a further object a method of manufacturing articles from metal plates by electric arc welding in which only one of the edges of each pair of edges to be joined is provided with an extension, with the result that the cost of preparing the groove forming edges is materially reduced and the accuracy of alignment of the edges to be joined is dependent solely on the tolerance allowed.

Figure 2:
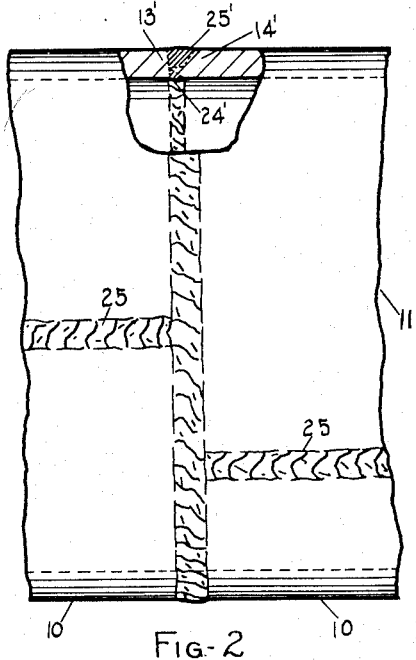
Figure 3:
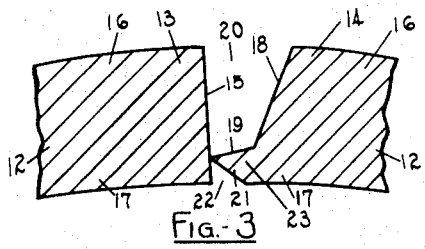
Figure 4:
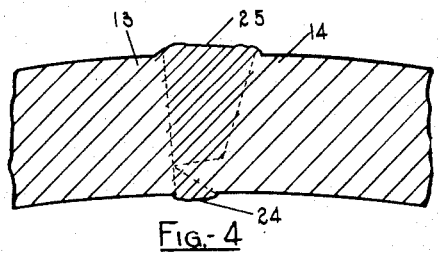
Figure 5:
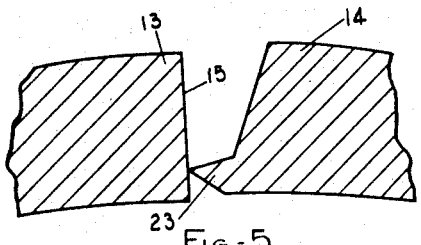
Figure 6:
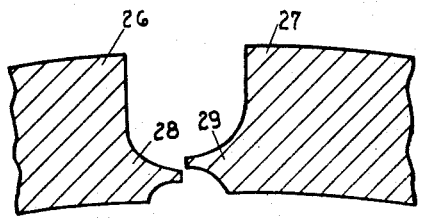

Other objects and advantages of the invention will be apparent from a consideration of the following detailed description thereof taken with the accompanying drawing, in which, Fig. 1 is an end sectional view of a cylindrical vessel manufactured in accordance with my invention, Fig. 2 is a side elevation, partly in section, showing a portion of a cylindrical vessel made up of a number of welded cylindrical sections, Fig. 3 is a sectional view showing the edges to be joined prepared for welding, Fig. 4 is a view similar to Fig. 3 showing a completed weld, Fig. 5 is a view similar to Fig. 3 but showing the edges to be joined somewhat out of alignment, and Fig. 6 is a view similar to Fig. 5, but with the edges to be joined formed as in the prior practice and out of alignment to the same degree as the edges of Fig. 6.

The method of this invention is suited to the manufacture of articles of all sizes and shapes at present manufactured out of metal plate by means of arc welding and is not limited to articles made from plate of any particular thickness. However, it is particularly suited to the manufacture of articles made from thick plate as its savings and other advantages are then most apparent. For instance it is suited to the manufacture of heavy walled cylindrical vessels such as penstocks and the like, and of heavy walled closed vessels such as the reaction vessels, towers, columns and the like used in the cracking of petroleum oil.

In manufacturing cylindrical section 10, which may be used by itself as a short conduit or may be joined to similar sections 10 to form open ended vessel 11 which in turn may be used as a penstock or as the body portion of a tower, column, or the like, the plate or plates 12, one plate only being shown, are first cut to the proper size. The pairs of edges 13 and 14, one pair only being shown, are then worked upon to bring them to the shape shown in Fig. 3. That is, a portion of edge 13 is cut away by machining or, as at present preferred, by cutting with a torch to form a wall 15 which is inclined to be a line perpendicular to faces 16 and 17 of plate 12, and a portion of edge 14 is cut away by machining to form a wall which includes wall 18 and bottom 19 of the main welding groove 20 and wall 21 of shallow supplementary groove 22, walls 19 and 21 being separated by projection or lip 23 which serves as the chilling member. Plate or plates 12 are then bent to the cylindrical form and assembled with each pair of edges 13 and 14 to be joined positioned as shown in Fig. 3. A single bead 24 is then deposited in shallow supplementary welding groove 22 by means of an electric arc struck between the walls of groove 22 and a fusible electrode. Although the bottom of groove 22 terminates in a sharp corner no difficulty is experienced in obtaining the proper molecular bend between the weld metal and the metal of the walls of groove 22 since groove 22 is shallow and the required metal can be deposited at a satisfactory rate from a small electrode.

Completed supplemental weld 24 sufficiently joins plate or plates 12 to allow manipulation of vessel 10 without disassembly thereof and together with extension 23 of edge 14 provides a satisfactory chilling member for the metal of main weld 25. The metal of main weld 25 is deposited in groove 20 by means of an electric arc as in the usual practice.

To form an open ended vessel, such as vessel 2 fragmentarily shown in Fig. 2, the requisite number of sections 10 are manufactured as just described. However, prior to the bending of plates 12 the edges 13' and 14', which are to form the ends of sections 10 are also worked upon to form component parts of welding grooves as explained in connection with edges 13 and 14. The completed sections 10 are then assembled in end to end relation and edges 13' and 14' brought into abutment in Fig. 3. The weld metal of grooves 24' and 25' is then deposited to unite sections 10 into an integral vessel. When it is desired to form a closed ended cylindrical vessel suitably shaped ends, not shown, having their edges shaped to form component parts of the welding groove are aligned with the cylindrical body portion and joined to it by means of circumferential welds similar to the circumferential weld above described.

It is to be particularly noted that with edges 13 and 14 and/or 13' and 14' shaped as shown and described there is no need for close fitting of the welding grooves. As shown in Fig. 5 projections 23 will define the desired groove so long as it contacts with face 15. As can be gathered from reference to Fig. 6 this is not the case with the preferred grooves of the prior art, for when edges 26 and 27 are out of alignment by an amount equal to the thickness of the ends of lips 28 and 29, which is usually less than the tolerance allowance, the desired groove is not formed. By reason of the irregular bottom thus produced it is extremely difficult to carry on the welding operation properly. Hence the present method is superior to the methods of the prior art for it eliminates the necessity for the accurate alignment of edges 13 and 14 and/or 13' and 14' thus keeping the cost of rigging to a minimum and yet assuring the desired groove.

The present method since it does not require accurate alignment of the edges to be joined will also take care of eccentricity of the plates to be joined as well as out of round conditions of sections 10 to be joined without the necessity of a great amount of rigging. Furthermore, since only one of the edges to be joined is machined the cost of manufacture is further decreased.

I claim:
1. In electric arc welding, the process of uniting metal plates which consists in forming one edge of each pair of edges to be joined into a continuous wall and the other edge into a wall having a surface sharply inclined to the face of its plate and an angular projection extending therefrom, assemblying the plates with the edges of each pair of edges to be joined in abutting relation to thereby form welding grooves, and depositing fusing metal by means of an electric arc in said welding grooves.

2. In electric arc welding, the process of uniting metal plates which consists in forming one edge of each pair of edges to be joined into a continuous wall angularly disposed to a line perpendicular to the faces of its plate and the other edge into a wall having a surface sharply inclined to the face of its plate and an angular projection extending therefrom, assemblying the plates with the edges of each pair of edges to be joined in abutting relation to thereby form welding grooves, and depositing fusing metal by means of an electric arc in said welding grooves.

3. In electric arc welding, the process of uniting metal plates which consists in forming one edge of each pair of edges to be joined into a straight continuous wall and the other edge into a wall having a surface sharply inclined to the face of its plate extending for the major portion of the thickness of its plate and an angular projection at the lower end of said sharply inclined surface extending therefrom, assembling the plates with the edges of each pair of edges to be joined in abutting relation to thereby form welding grooves, and depositing fusing metal by means of an electric arc in said welding grooves.

4. In electric arc welding, the process of uniting plates which consists in forming one edge of each pair of edges to be joined into a straight continuous wall angularly disposed to a line perpendicular to the faces of its plate and the other edge into a second wall having a surface sharply inclined to the face of its plate extending for the major portion of the thickness of its plate and an angular projection at the lower end of said sharply inclined surface extending therefrom, said projection having its minimum thickness at a region intermediate the ends of said second wall, assembling the plates with the edges of each pair of edges to be joined in abutting relation to thereby form a pair of welding grooves along each pair of edges to be joined, and depositing fusing metal by means of an electric arc in said welding grooves.

5. In electric arc welding, the process of uniting plates which consists in forming one edge of each pair of edges to be joined in a straight continuous wall and the other edge into a second wall made up of three surfaces, the first of said surfaces commencing at the top of the plate and extending for the major portion of the thickness thereof, said first surface being sharply inclined to said top face, the second of said surfaces commencing at the end of said first surface and extending away from the plate, said second surface approaching parallelism with said top face, the third of said surfaces commencing at the bottom face of the plate and angularly extending therefrom to meet said second surface and therewith to define a substantially V-shaped projection, assembling the plates with the edges of each pair of edges to be joined in abutting relation to thereby form a main welding groove on one face and a shallow supplementary welding groove on the other face of the plates along each pair of edges to be joined, depositing fusing metal into said shallow groove by means of an electric arc to partly unite said edges to be joined, and depositing fusing metal by means of an electric arc in said main groove to complete the union of said plates.

6. In electric arc welding the process of uniting plates which consists in forming one edge of each pair of edges to be joined into a straight continuous wall angularly disposed to a line perpendicular to the faces of its plate and the other edge into a second wall having a surface sharply inclined to the face of its plate and a substantially V-shaped projection extending from one end thereof, assembling the plates with the edges of each pair of edges to be joined in abutting relation to thereby form a main welding groove on one face and a shallow supplementary welding groove on the other face of the plates along each pair of edges to be joined, depositing fusing metal into said shallow groove by means of an electric arc to partly unite said edges to be joined and to form a chilling member for said main groove, and depositing fusing metal into said main groove to complete the union of said plates.

7. The method of manufacturing cylindrical vessels from metal plates by electric arc welding, which comprises cutting plates required to form the vessel to size, forming one edge of each pair of edges to be joined into a straight continuous wall and the other edge into a wall having a surface sharply inclined to the face of its plate and a V-shaped projection at one end thereof, bending said plates, assemblying said plates with the edges to be joined in abutting relation, and uniting said plates by depositing fusing metal by means of an electric arc in the grooves defined by said abutting edges.

8. The method of manufacturing cylindrical vessels composed of a plurality of cylindrical sections formed from metal plates by arc welding, which comprises cutting to size the plates required to form the cylindrical sections, forming one edge of each pair of edges of said plates to be joined in the manufacture of the vessel into a straight continuous wall and the other edge into a wall having a surface sharply inclined to the face of its plate and a tapered projection at one end thereof, bending said plates, assembling said sections with the edges of said plates to be joined in abutment to define between them welding grooves, depositing fusing metal by means of an electric arc in said welding grooves to unite the plates of said sections, placing said sections in end to end relation with the edges to be joined to complete said cylindrical vessel in abutment to define between them welding grooves, and depositing fusing metal by means of an electric arc in the grooves last mentioned to unite said sections.

ALEXANDER KIDD.